(12) United States Patent
Takahashi

(10) Patent No.: US 6,845,173 B2
(45) Date of Patent: Jan. 18, 2005

(54) APPARATUS AND METHOD OF INPUTTING FINGERPRINTS

(75) Inventor: Nobuo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 541 days.

(21) Appl. No.: 09/727,499

(22) Filed: Dec. 4, 2000

(65) Prior Publication Data

US 2001/0040988 A1 Nov. 15, 2001

(51) Int. Cl.$^7$ .................................................. G06K 9/00
(52) U.S. Cl. ...................................................... 382/124
(58) Field of Search ................................. 382/115, 116, 382/124–127; 340/5.53, 5.83; 235/380, 382, 382.5; 902/3–6

(56) References Cited

U.S. PATENT DOCUMENTS

| | | | | |
|---|---|---|---|---|
| 5,828,773 A | * | 10/1998 | Setlak et al. | 382/126 |
| 5,999,637 A | * | 12/1999 | Toyoda et al. | 382/124 |
| 6,091,839 A | * | 7/2000 | Uchida | 382/125 |

FOREIGN PATENT DOCUMENTS

| | | |
|---|---|---|
| JP | 6-309440 | 11/1994 |
| JP | 7-146940 | 6/1995 |
| JP | 2949007 | 7/1999 |

OTHER PUBLICATIONS

Japanese Office dated Dec. 1, 2003, with English translation of pertinent portions.
Japanese Office Action Aug. 8, 2003 with English translation of pertinent portions.

* cited by examiner

Primary Examiner—Vikkram Bali
(74) Attorney, Agent, or Firm—Whitham, Curtis & Christofferson, P.C.

(57) ABSTRACT

A fingerprint input apparatus is provided that specifies the cause when a failure in fingerprint reading occurs and then notifies a user of the content of the cause and/or the countermeasure against it. The fingerprint input apparatus comprises a fingerprint sensor (1) for reading a fingerprint and then outputting fingerprint image data corresponding to the fingerprint, a fingerprint analyzer (3) for analyzing the quality of a fingerprint image represented by fingerprint image data and creating an evaluation result representing the cause of the quality failure and/or a countermeasure against it when the analysis result indicates a quality failure, and an evaluation result display (2) for displaying the evaluation result.

20 Claims, 2 Drawing Sheets

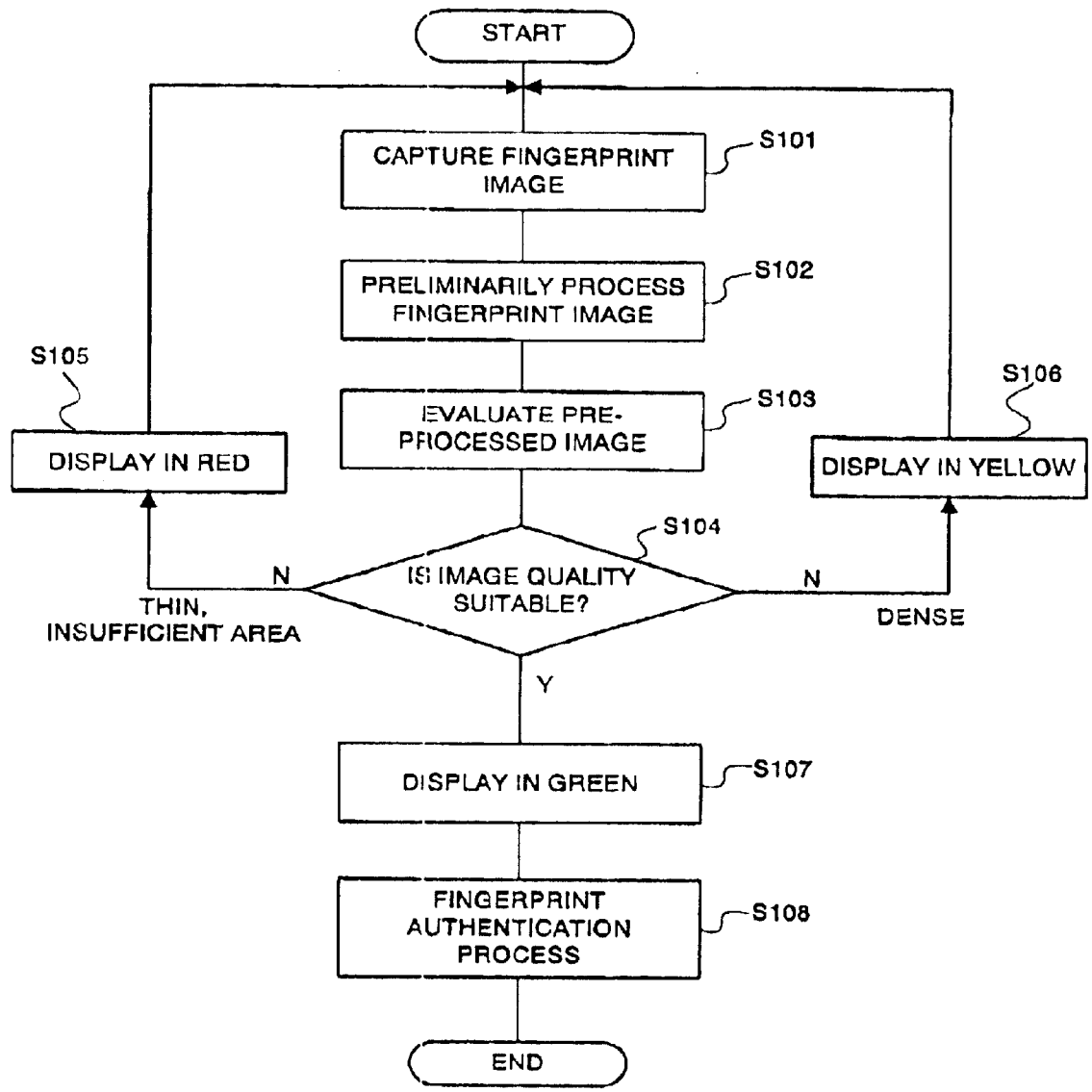

APPARATUS AND METHOD OF INPUTTING FINGERPRINTS

BACKGROUND OF THE INVENTION

The present invention relates to a fingerprint input apparatus that reads fingerprints and to a method for the same.

A person can be identified through fingerprint authentication. A fingerprint input apparatus is used for fingerprint authentication. The fingerprint input apparatus has a fingerprint reading function and the function of verifying a read fingerprint against a previously-registered fingerprint. A fingerprint sensor realizes the fingerprint reading function. The fingerprint sensor is pressed by a finger of a user to read the fingerprint thereof. When the acquired fingerprint matches with a registered fingerprint, the fingerprint verification is established. When the acquired fingerprint does not match with the registered fingerprint, the fingerprint verification is not established.

The technique related to the fingerprint input apparatus is disclosed in Japanese Patent Publication No. 2949007, JP-A No. 272886/1986, JP-A No. 225345/1993, and JP-A No. 161491/1996.

An improper press of a finger against the fingerprint sensor causes an erroneous fingerprint reading of the fingerprint sensor. Moreover, a failure due to moisture on a finger causes an erroneous fingerprint reading of the fingerprint sensor. An occurrence of a fingerprint reading failure results in degradation in the accuracy of fingerprint verification. When the accuracy of fingerprint verification decreases, the fingerprint verification becomes a non-established state even in the inputting of a correct fingerprint. When a significant failure in fingerprint reading occurs, the fingerprint authentication process may not be activated. In such a case, a user has to require a countermeasure against the cause of the fingerprint reading failure.

When a failure in fingerprint reading occurs, the conventional fingerprint input apparatus issues an alarm of a failure occurrence or displays re-execution of a fingerprint reading. However, the conventional fingerprint input apparatus does not notify a user of the cause of an occurrence of a fingerprint reading failure. When a user recognizes the occurrence of a fingerprint reading failure, he cleans the finger and changes the position on which the finger is pressed against the fingerprint sensor. This operation is performed by the user in response to an assumed cause of a fingerprint reading failure. That is, the user must take a countermeasure without recognizing the actual cause of a fingerprint reading failure.

SUMMARY OF THE INVENTION

This invention is made to overcome the above-mentioned problems. An objective of the present invention is to provide a fingerprint input apparatus that specifies the cause of a failure in reading a fingerprint and then notifies a user of the content of the cause and/or the countermeasure against it.

Another objective of the present invention is to provide a fingerprint input method that specifies the cause of a failure in reading a fingerprint and then notifies a user of the content of the cause and/or the countermeasure against it.

In order to overcome the above-mentioned problems, a fingerprint input apparatus, according to the present invention, comprises a fingerprint sensor (1) for reading a fingerprint and then outputting fingerprint image data corresponding to the fingerprint: a fingerprint analyzer (3) for analyzing the quality of a fingerprint image represented by the fingerprint image data and creating an evaluation result representing the cause of the quality failure and/or a countermeasure against the cause when the analysis result indicates a quality failure; and an evaluation result display (2) for displaying the evaluation result.

A user of the fingerprint input apparatus can remove the cause of a quality failure based on an evaluation result manifested on the evaluation result display (2).

In the fingerprint input apparatus according to the present invention, the fingerprint analyzer (3) comprises a quality evaluation and processing section (32) for performing the analysis based on the image quality and/or feature points of a fingerprint image represented by the fingerprint image data; and an evaluation result display and processing section (33) for driving the evaluation result display (2) based on the evaluation result.

In the fingerprint input apparatus according to the present invention, the fingerprint sensor (1) comprises a light source and art image pickup device.

In the fingerprint input apparatus defined according to the present invention, the quality evaluation and processing section (32) performs the analysis based on any one of the density of the fingerprint image, a fingerprint display area indicated by the fingerprint image, the shape of ridges indicated by the fingerprint image, and the position of a spiral shape indicated by the fingerprint image.

In the fingerprint input apparatus according to the present invention, the evaluation result display (2) includes light emitting elements for visually displaying the evaluation result.

In the fingerprint input apparatus according to the present invention, the evaluation result display (2) includes a display panel for visually displaying the evaluation result.

In the fingerprint input apparatus according to the present invention, the evaluation result display includes an acoustic device for acoustically displaying the evaluation result.

Moreover, according to the present invention, a fingerprint input method comprises the steps of reading a fingerprint and then outputting fingerprint image data corresponding to the fingerprint; analyzing the quality of a fingerprint image represented by the fingerprint image data and creating an evaluation result representing the cause of the quality failure and/or a countermeasure against the cause when the analysis result indicates a quality failure; and displaying the evaluation result.

In the above description, numerals with parentheses are respectively attached to technical matters. The numerals respectively correspond to reference numerals attached to the technical matters configuring at least one specific mode or plural embodiments of the present invention, particularly, to the technical matters expressed in drawings corresponding to the mode or embodiments. The reference numerals clarify the correspondences between technical matters in claims and technical matters in embodiments or embodiments. It should be noted that the correspondence does not means that the technical matters in claims are restrictively construed as those in mode or embodiments.

BRIEF DESCRIPTION OF THE DRAWINGS

This and other objects, features and advantages of the present invention will become more apparent upon a reading of the following detailed description and drawings, in which:

FIG. 2 is a flowchart for the fingerprint input apparatus according to an embodiment of the present invention.

DESCRIPTION OF THE EMBODIMENTS

Figure 1:
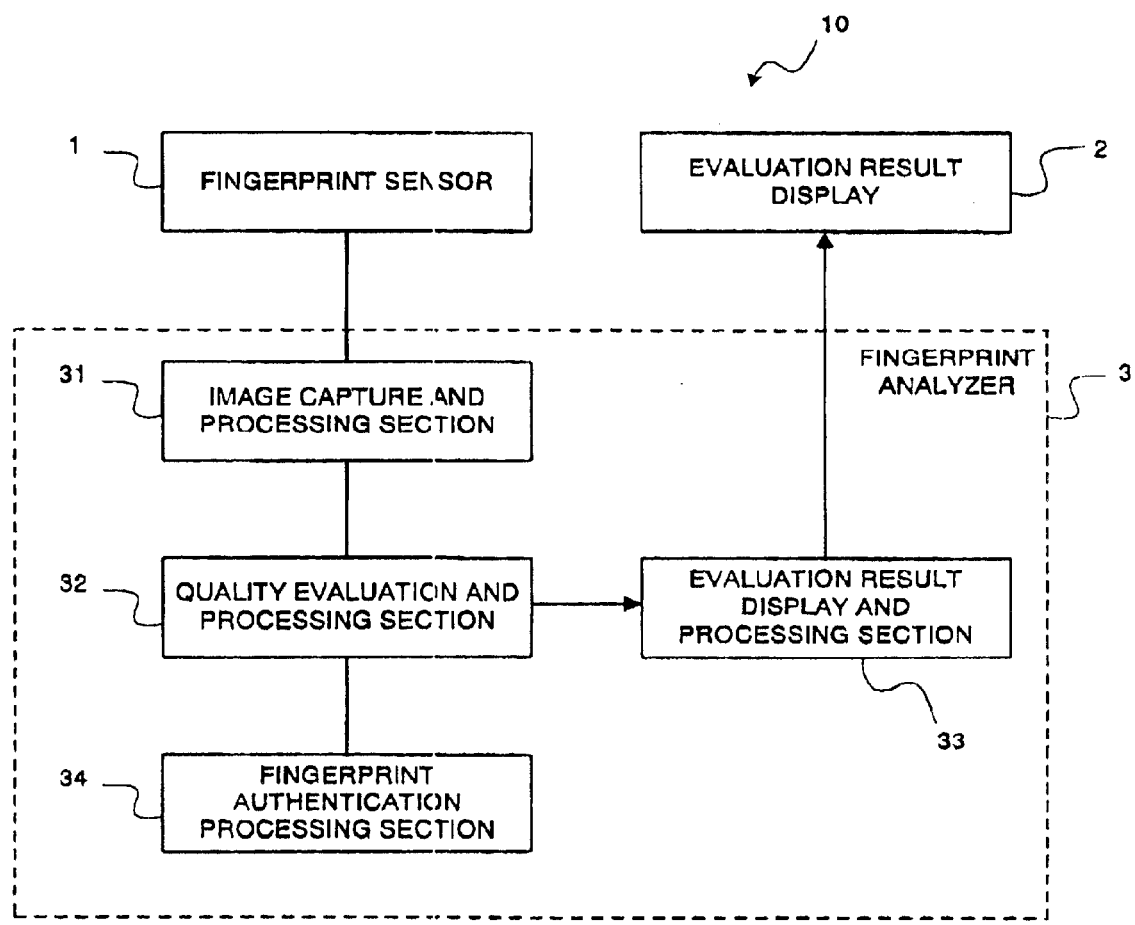
FIG. 1 is a block diagram illustrating a fingerprint input apparatus according to an embodiment of the present invention.

FIG. 1 is a diagram illustrating a fingerprint input apparatus according to an embodiment of the present invention. Referring to FIG. 1, the fingerprint input apparatus 10 includes a fingerprint sensor 1, an evaluation result display 2, and a fingerprint analyzer 3. The fingerprint analyzer 3 includes an image capture and processing section 31, a quality evaluation and processing section 32, and an evaluation result display and processing section 33, a fingerprint authentication and processing section 34.

The fingerprint sensor 1 is connected to the image capture and processing section 31. The image capture and processing section 31 is connected to the quality evaluation and processing section 32. The quality evaluation capture and processing unit 32 is connected to the evaluation result display and processing section 33. The quality evaluation and processing section 32 is connected to the fingerprint authentication and processing section 34. The evaluation result display and processing section 33 is connected to the evaluation result display 2.

The sensor 1 has a light source and a light receiving element. The light source is formed of a fluorescent tube. The light emitting element is formed of a charge-coupled device (CCD). The evaluation result display 2 has light emitting diodes and a message panel. The message panel is a panel on which plural messages specified by light emitting diodes in on state are printed. The number of light emitting diodes corresponds to the number of messages on the message panel. The fingerprint analyzer 3 drives the fingerprint sensor 1 and controllably acquires fingerprint data (image data). The fingerprint analyzer 3 drives the evaluation result display 2 and notifies a user of a fingerprint reading failure. The fingerprint analyzer 3 performs a finger verification process. The fingerprint analyzer 3 is a processor that includes a program for executing various processes and hardware.

The image capture and processing section 31 creates image data based on the output signal of the fingerprint sensor 1. The quality evaluation and processing section 32 evaluates the quality of image data created by the image capture and processing section 31. The evaluation is performed by referring to a fingerprint image and noting the density of a fingerprint portion, the area of a fingerprint portion, differences in density between a ridge and a groove, and the continuity of a ridge.

When detecting an insufficient the density of an image (blur or failure in continuity of ridges), the quality evaluation and processing section 32 notifies the evaluation result display and processing section 33 of an occurrence of a fingerprint reading failure and of detection results. When detecting a missing area of an image, the quality evaluation and processing section 32 notifies the evaluation result display and processing section 33 of an occurrence of a fingerprint reading failure and detection results. When detecting an excessive density of an image, the quality evaluation and processing section 32 notifies the evaluation result display and processing section 33 of an occurrence of a fingerprint reading failure and detection results.

The evaluation result display and processing section 33 drives the evaluation result display 2 based on notification content of the quality evaluation and processing section 32. When receiving a notification on detection of a blurred image, the evaluation result display and processing section 33 lights light emitting diodes corresponding to a message indicating an increase in moisture of a finger. When receiving a notification on detection of a missing area of an image, the evaluation result display and processing section 33 lights light emitting diodes indicating an increase in the push pressure of a finger. When receiving an excessive density of an image, the evaluation result display and processing section 33 lights light emitting diodes corresponding to a message indicating a decrease in moisture and a decrease in push pressure of a finger.

The image quality evaluation and processing section 32 transfers image data to the fingerprint authentication and processing section 34 when the quality of image data is good. The fingerprint authentication and processing section 34 extracts feature points from a fingerprint image indicating image data. The feature point means the shape of ridges of a fingerprint or the shape of a spiral indicating the center of a fingerprint. The fingerprint authentication and processing section 34 analyzes whether or not a spiral shape is roughly positioned at the center of a fingerprint image. When the spiral shape is not roughly positioned at the center of the fingerprint image or cannot be detected, the fingerprint authentication and processing section 34 judges that the feature points are faulty. The fingerprint authentication and processing section 34 notifies the evaluation result display and processing section 33 of an occurrence of a feature point failure and of detection results.

The evaluation result display and processing section 33 drives the evaluation result display 2 based on the notification content of the fingerprint authentication and processing section 34. When accepting a notification on a feature point failure (a shift of the center of a spiral fingerprint), the evaluation result display and processing section 33 lights light emitting diodes corresponding to a message indicating a change of the position at which the finger is pressed.

When the feature points are normally extracted, the fingerprint authentication and processing section 34 verifies a fingerprint image indicated by image data against a previously registered fingerprint image. When detecting a match, the fingerprint authentication and processing section 34 approves the entered fingerprint. When detecting a mismatch, the fingerprint authentication and processing section 34 denies the entered fingerprint.

The operation of the fingerprint input apparatus 10 of the present invention will be explained in detail with reference to FIG. 2. FIG. 2 shows the operation of the fingerprint input apparatus of the present invention. The image capture and processing section 31 drives the fingerprint sensor 1 and then acquires the fingerprint image (step S101). The image capture and processing section 31 implements to the fingerprint image a preliminary process including a binarizing process, a background cancellation process, a noise cancellation process, a line segment extraction process, a deficit backup process, and others (step S102). This preliminary process may be partially omitted. Otherwise, another process may be added to the preliminary process. The fingerprint image conducted to the preliminary process of the image capture and processing section 31 is formed of information representing ridges of a fingerprint. The quality evaluation and processing section 32 refers to the fingerprint image created by the image capture and processing section 31 and analyzes the area of a fingerprint and the continuity of the ridge, thus evaluating the quality of the fingerprint image (step S103).

When detecting that the image is too thin (e.g. blur due to lack of density or shortage in area), the quality evaluation and processing section 32 notifies the evaluation result display and processing section 33 of the detection result. The evaluation result display and processing section 33 instructs the evaluation result display 2 to light the red light emitting diodes (step S105). On the evaluation result display 2, red light emitting diodes correspond to a message indicating an increase in moisture of a finger and an increase in pressure of a finger. The user, who has recognized the lighting of the red light emitting diodes, can adjust the moisture of a finger and the pressure by the finger.

When detecting that the image is too dense (including a defaced image due to excessive density), the quality evaluation and processing section 32 notifies the evaluation result display and processing section 33 of the detection result. The evaluation result display and processing section 33 instructs the evaluation result display 2 to light the yellow light emitting diodes (step S106). On the evaluation result display 2, yellow light emitting diodes correspond to a message indicating a decrease in moisture of a finger, a decrease in pressure of a finger, and a change of the center position thereof. The user, who has recognized the lighting of the yellow light emitting diodes, can adjust the moisture of a finger and a pressure by the finger.

When the density of an image is good, the quality evaluation and processing section 32 extracts feature points of a fingerprint image. When a defect of feature points is detected, the quality evaluation and processing section 32 instructs the evaluation result display 2 to light, for example, the red light emitting diodes and the yellow light emitting diodes. On the evaluation result display 2, the simultaneous lighting of red and yellow light emitting diodes corresponds to a message indicating a change of the position at which a finger presses. The user, who has recognized the simultaneous lighting of the red and yellow light emitting diodes, can adjust the pressing position of the finger. A defect of feature points means that the spiral shape is shifted from the center of the image or that the amount of information regarding the shape of the ridges is insufficient.

When the quality of a fingerprint image is good, the image capture and processing section 31 notifies the evaluation result display and processing section 33 of the detection result and then transfers the fingerprint image to the fingerprint authentication and processing section 34.

When feature points are completely extracted, the fingerprint authentication and processing section 34 indicates the evaluation result display 2 to light the green light emitting diodes (step S107). On the evaluation result display 2, the green light emitting diodes correspond to a message urging the user to wait for an authentication result. The fingerprint authentication and processing section 34 executes a fingerprint authentication process that compares the content of a fingerprint image and the content of a previously registered image (step S108).

As described above, in the fingerprint input apparatus of the present invention, a user can take measures to correct the state of a finger, as indicated by the light emitting diodes activated. The countermeasure can be taken with reference to the message corresponding to light emitting diodes.

It should be noted that the present invention is not restricted to only the above-mentioned embodiments. The evaluation result display 2 may be a display that manifests an instruction to a user. The evaluation result display may be an acoustic device that acoustically issues an instruction to a user. Evaluation contents handled by the quality evaluation and processing section 32 are not be limited to above-mentioned contents. Addition or removal may be suitably made to the evaluation content if the fingerprint reading accuracy does not decrease or increases. The fingerprint sensor 1 is not limited to only the combination of a light source and an image pickup device. The fingerprint sensor 1 may be of a semiconductor electrostatic capacitance detection element array. The fingerprint sensor 1 may be of a semiconductor field-strength detection element array. The fingerprint sensor 1 may include a natural-light source. The fingerprint sensor 1 may include an optical detection element array, instead of an image pickup device.

According to present invention, the fingerprint input apparatus specifies the failure cause when a fingerprint reading failure occurs and then issues an instruction for removing the cause. For that reason, it can be avoided that a user may take an inadequate countermeasure or no countermeasures.

Moreover, the present invention can decrease the possibility that authentication may be denied even in a correct fingerprint reading operation of a user. That is, the authentication rejection rate (personal identification refusal rate) can be improved.

Moreover, according to the present invention, the fingerprint input apparatus can avoid user embarrassment caused by a reading failure. The user can be released from unpleasantness caused by authentication failure or because the cause of authentication failure that cannot be grasped.

Moreover, according to the present invention, the fingerprint input apparatus can avoid that when a reading failure occurs, a user may take unnecessary countermeasures or no countermeasures. In other words, it is possible to shorten the processing period between the fingerprint reading operation and the fingerprint authentication process.

The entire disclosure of Japanese Patent Application No. 11-347419 filed on Dec. 7, 1999 including specification, claims, drawing and summary are incorporated herein by reference in its entirety.

What is claimed is:

1. A fingerprint input apparatus, comprising:

a fingerprint sensor for reading a fingerprint;

a fingerprint analyzer for
acquiring a fingerprint image corresponding to said read fingerprint,
analyzing the quality of said fingerprint image based on an image quality and/or feature points of said fingerprint image, and
generating an evaluation result if a result of said analysis indicates a quality malfunction; and an evaluation result display for displaying said evaluation result in a plurality of ways, wherein,
if said quality malfunction indicates a first quality malfunction associated with said image quality, said fingerprint analyzer generates a first evaluation result that indicates a cause of said first quality malfunction and/or a countermeasure for said cause of said first quality malfunction as said evaluation result, and
if said quality malfunction indicates a second quality malfunction associated with said feature points, said fingerprint analyzer generates a second evaluation result that indicates a cause of said second quality malfunction and/or a countermeasure for said cause of said second quality malfunction as said evaluation result, wherein said first quality malfunction includes at least one of
- a quality malfunction associated with a fingerprint display area of said fingerprint image and
- a quality malfunction associated with a shape of ridges of said fingerprint image, and wherein the quality malfunction associated with the shape of ridges of said fingerprint image includes a continuity malfunction of a ridge of said fingerprint image.

2. The fingerprint input apparatus defined in claim 1, wherein said fingerprint analyzer comprises:
- a quality evaluation and processing means for performing the analysis based on the image quality and/or feature points of a fingerprint image represented by said fingerprint image data; and
- an evaluation result display and processing means for driving said evaluation result display based on said evaluation result.

3. The fingerprint input apparatus defined in claim 2, wherein said fingerprint sensor comprises a light source and an image pickup device.

4. The fingerprint image apparatus defined in claim 2, wherein said quality evaluation and processing means performs the analysis based on any one of the density of said fingerprint image, a fingerprint display area indicated by said fingerprint image, the shape of ridges indicated by said fingerprint image, and the position of a spiral shape indicated by said fingerprint image.

5. The fingerprint image apparatus defined in claim 2, wherein said plurality of ways for evaluation result display is drawn from the group of light emitting elements for visually displaying said evaluation result, a display panel for visually displaying said evaluation result, and an acoustic device for acoustically displaying said evaluation result.

6. The fingerprint image apparatus defined in claim 2, wherein said plurality of ways for evaluation result display includes a display panel for visually displaying said evaluation result and light emitting elements for visually displaying said evaluation result.

7. The fingerprint image apparatus defined in claim 6, wherein said evaluation result display also includes an acoustic device for acoustically displaying said evaluation result.

8. The fingerprint image apparatus defined in claim 1, wherein said fingerprint sensor comprises a light source and an image pickup device.

9. The fingerprint image apparatus defined in claim 8, wherein said fingerprint analyzer performs the analysis based on any one of the density of said fingerprint image, a fingerprint display area indicated by said fingerprint image, the shape of ridges indicated by said fingerprint image, and the position of a spiral shape indicated by said fingerprint image.

10. The fingerprint image apparatus defined in claim 8, wherein said plurality of ways for evaluation result display is drawn from the group of light emitting elements for visually displaying said evaluation result, a display panel for visually displaying said evaluation result, and an acoustic device for acoustically displaying said evaluation result.

11. The fingerprint image apparatus defined in claim 8, wherein said plurality of ways for evaluation result display includes a display panel for visually displaying said evaluation result and light emitting elements for visually displaying said evaluation result.

12. The fingerprint image apparatus defined in claim 11, wherein said evaluation result display also includes an acoustic device for acoustically displaying said evaluation result.

13. The fingerprint image apparatus defined in claim 1, wherein said fingerprint analyzer performs the analysis based on any one of the density of said fingerprint image, a fingerprint display area indicated by said fingerprint image, the shape of ridges indicated by said fingerprint image, and the position of a spiral shape indicated by said fingerprint image.

14. The fingerprint image apparatus defined in claim 13, wherein said plurality of ways for evaluation result display is drawn from the group of light emitting elements for visually displaying said evaluation result, a display panel for visually displaying said evaluation result, and an acoustic device for acoustically displaying said evaluation result.

15. The fingerprint image apparatus defined in claim 13, wherein said plurality of ways for evaluation result display includes a display panel for visually displaying said evaluation result and light emitting elements for visually displaying said evaluation result.

16. The fingerprint image apparatus defined in claim 15, wherein said evaluation result display also includes an acoustic device for acoustically displaying said evaluation result.

17. The fingerprint image apparatus defined in claim 1, wherein said plurality of ways for evaluation result display is drawn from the group of light emitting elements for visually displaying said evaluation result, a display panel for visually displaying said evaluation result, and an acoustic device for acoustically displaying said evaluation result.

18. The fingerprint image apparatus defined in claim 1, wherein said plurality of ways for evaluation result display includes a display panel for visually displaying said evaluation result and light emitting elements for visually displaying said evaluation result.

19. The fingerprint image apparatus defined in claim 18, wherein said evaluation result display also includes an acoustic device for acoustically displaying said evaluation result.

20. A fingerprint input method comprising the steps of:
- reading a fingerprint and then outputting fingerprint image data corresponding to said fingerprint;
- analyzing the quality of a fingerprint image based on an image quality and/or feature points of said fingerprint image, and generating an evaluation result if a result of said analysis indicates a quality malfunction; and
- displaying said evaluation result in a plurality of ways, wherein,
  - if said quality malfunction indicates a first quality malfunction associated with said image quality, said fingerprint analyzing step generates a first evaluation result that indicates a cause of said first quality malfunction and/or a countermeasure for said cause of said first quality malfunction as said evaluation result, and
  - if said quality malfunction indicates a second quality malfunction associated with said feature points, said fingerprint analyzing step generates a second evaluation result that indicates a cause of said second quality malfunction and/or a countermeasure for said cause of said second quality malfunction as said evaluation result, wherein said first quality malfunction includes at least one of
- a quality malfunction associated with a fingerprint display area of said fingerprint image and
- a quality malfunction associated with a shape of ridges of said fingerprint image, and wherein the quality malfunction associated with the shape of ridges of said fingerprint image includes a continuity malfunction of a ridge of said fingerprint image.

* * * * *